United States Patent
Kim et al.

(10) Patent No.: US 10,963,527 B2
(45) Date of Patent: *Mar. 30, 2021

(54) ASSOCIATING USER LOGS USING GEO-POINT DENSITY

(71) Applicant: ADOBE INC., San Jose, CA (US)

(72) Inventors: Sungchul Kim, San Jose, CA (US); Nedim Lipka, Santa Clara, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/254,125

(22) Filed: Jan. 22, 2019

(65) Prior Publication Data
US 2019/0155863 A1 May 23, 2019

Related U.S. Application Data

(63) Continuation of application No. 15/043,363, filed on Feb. 12, 2016, now Pat. No. 10,223,462.

(51) Int. Cl.
*G06F 16/29* (2019.01)
*G06F 16/9535* (2019.01)
*G06F 16/335* (2019.01)

(52) U.S. Cl.
CPC ........ *G06F 16/9535* (2019.01); *G06F 16/337* (2019.01)

(58) Field of Classification Search
CPC ...................................................... G06F 16/29
USPC .......................................................... 707/736
See application file for complete search history.

(56) References Cited

U.S. PATENT DOCUMENTS

| | | | |
|---|---|---|---|
| 9,413,837 B2 * | 8/2016 | Vaccari | H04W 4/023 |
| 9,442,905 B1 | 9/2016 | Kawaguchi | |
| 2014/0222810 A1 * | 8/2014 | Vaccari | G06F 16/9024 707/736 |
| 2014/0258280 A1 | 9/2014 | Wilson et al. | |
| 2015/0149091 A1 | 5/2015 | Milton et al. | |

(Continued)

OTHER PUBLICATIONS

Bach, S. H., Broecheler, M., Huang, B., & Getoor, L. (2015). Hinge-loss markov random fields and probabilistic soft logic. arXiv preprint arXiv:1505.04406.

(Continued)

*Primary Examiner* — Baoquoc N To
(74) *Attorney, Agent, or Firm* — Shook, Hardy & Bacon L.L.P.

(57) ABSTRACT

A method for clustering geolocations using geo-point density includes receiving a user log of geolocation data extracted from user interactions with at least one electronic device. A density is determined relative to other geo-points for each geo-point in a set of geo-points extracted from the user log. Lower density geo-points in the set are merged into higher density geo-points in the set to result in a merged set of geo-points, and clusters of geo-points are identified from the merged set. Merging the geo-points tends to preserve frequently occurring geo-points while reducing those that constitute noise, which improves the reliability of identifying the clusters. Core geo-points of the user log are selected from the clusters. The core geo-points of the user log can be compared to core geo-points of other use logs to identify associations between the user logs.

20 Claims, 6 Drawing Sheets

(56) References Cited

U.S. PATENT DOCUMENTS

2016/0196577 A1 7/2016 Reese et al.
2016/0253689 A1 9/2016 Milton et al.

OTHER PUBLICATIONS

Bach, S., Huang, B., London, B., & Getoor, L. (2013). Hinge-loss Markov random fields: Convex inference for structured prediction. arXiv preprint arXiv:1309.6813.

Backstrom, L., Kleinberg, J., Kumar, R., & Novak, J. (Apr. 2008). Spatial variation in search engine queries. In Proceedings of the 17th international conference on World Wide Web (pp. 357-366). ACM.

Backstrom, L., Sun, E., & Marlow, C. (Apr. 2010). Find me if you can: improving geographical prediction with social and spatial proximity. In Proceedings of the 19th international conference on World wide web (pp. 61-70). ACM.

Casado, M., & Freedman, M. J. (Apr. 2007). Peering through the shroud: The effect of edge opacity on IP-based client identification. In Proceedings of the 4th USENIX conference on Networked systems design & implementation (pp. 13-13). USENIX Association.

Le Cessie, S., & Van Houwelingen, J. C. (1992). Ridge estimators in logistic regression. Applied statistics, 191-201.

Crandall, D. J., Backstrom, L., Huttenlocher, D., & Kleinberg, J. (Apr. 2009). Mapping the world's photos. In Proceedings of the 18th international conference on World wide web (pp. 761-770). ACM.

Dasgupta, A., Gurevich, M., Zhang, L., Tseng, B., & Thomas, A. 0. (Feb. 2012). Overcoming browser cookie churn with clustering. In Proceedings of the fifth ACM international conference on Web search and data mining (pp. 83-92). ACM.

Eckersley, P. (Jul. 2010). How unique is your web browser?. In Privacy Enhancing Technologies (vol. 6205, pp. 1-18).

Fakhraei, S., Huang, B., Raschid, L., & Getoor, L. (2014). Network-based drug-target interaction prediction with probabilistic soft logic. IEEE!Acm Transactions on Computational Biology and Bioinformatics, 11 (5), 775-787.

Google Universal Analytics. (2015). Cookies and User Identification. Analytics for Web (analytics.js). Retrieved from the internet at <https://web.archive.org/web/20160111010633/hhttps://developers.google.com/analytics/devguides/collection/analyticsjs/cookies-user-id>.

Guha, S., & Mishra, N. (2016). Clustering data streams. In Data Stream Management (pp. 169-187). Springer Berlin Heidelberg.

John, G. H., & Langley, P. (Aug. 1995). Estimating continuous distributions in Bayesian classifiers. In Proceedings of the Eleventh conference on Uncertainty in artificial intelligence (pp. 338-345). Morgan Kaufmann Publishers Inc.

Kim, S., Kini, N., Pujara, J., Koh, E., & Getoor, L. (Apr. 2017). Probabilistic Visitor Stitching on Cross-Device Web Logs. In Proceedings of the 26th International Conference on World Wide Web (pp. 1581-1589). International World Wide Web Conferences Steering Committee.

Kouki, P., Fakhraei, S., Foulds, J., Eirinaki, M., & Getoor, L. (Sep. 2015). Hyper: A flexible and extensible probabilistic framework for hybrid recommender systems. In Proceedings of the 9th ACM Conference on Recommender Systems (pp. 99-1 06). ACM.

Liben-Nowell, D., Novak, J., Kumar, R., Raghavan, P., & Tomkins, A. (2005). Geographic routing in social networks. Proceedings of the National Academy of Sciences of the United States of America, 1 02(33), 11623-11628.

London, B., Khamis, S., Bach, S., Huang, B., Getoor, L., & Davis, L. (2013). Collective activity detection using hinge-loss Markov random fields. In Proceedings of the IEEE Conference on Computer Vision and Pattern Recognition Workshops (pp. 566-571).

Montanez, G. D., White, R. W., & Huang, X. (Nov. 2014). Cross-device search. In Proceedings of the 23rd ACM International Conference on Conference on Information and Knowledge Management (pp. 1669-1678). ACM.

Pujara, J., London, B., & Getoor, L. (Jul. 2015). Budgeted online collective inference. In Proceedings of the Thirty-first Conference on Uncertainty in Artificial Intelligence (pp. 712-721). AUAI Press.

Pujara, J., Miao, H., Getoor, L., & Cohen, W. (Oct. 2013). Knowledge Graph Identification. In Proceedings of the 12th International Semantic Web Conference—Part I (pp. 542-557). Springer-Verlag New York, Inc.

Saha Roy, R., Sinha, R., Chhaya, N., & Saini, S. (May 2015). Probabilistic deduplication of anonymous web traffic. In Proceedings of the 24th International Conference on World Wide Web (pp. 103-104). ACM.

Salzberg, S. L. (1994). C4. 5: Programs for machine learning by j. ross quinlan. morgan kaufmann publishers, inc., 1993. Machine Learning. 16(3), 235-240.

West, D.B. (2001). Introduction to graph theory (vol. 2). Upper Saddle River: Prentice Hall. Uploaded in two parts.

White, R. W., & Awadallah, A. H. (Aug. 2015). Personalizing Search on Shared Devices. In Proceedings of the 38th International ACM SIGIR Conference on Research and Development in Information Retrieval (pp. 523-532). ACM.

\* cited by examiner

ASSOCIATING USER LOGS USING GEO-POINT DENSITY

BACKGROUND

As the number of web users who access web services increases, so does the number of such users who do so anonymously. Visitor stitching aims to identify which user logs belong to the same user, even where the logs represent anonymous user sessions. This identification is central to a wide variety of applications on the web that aim to provide personalized services and experiences to users. Unfortunately, visitor stitching can be complicated in that user logs, such as web or cookie logs, corresponding to a single user often span many devices and applications, including a mix of logged-in and anonymous sessions.

Approaches to visitor stitching have compared search behavior, purchase history, and topical and content information between logs to determine whether the logs belong to the same user. This information is unlikely to be universal across separate domains, meaning some logs could lack this information, or it could be expressed inconsistently amongst the logs. Geolocation information tends to be more consistent and available amongst domains. Approaches that employ geolocation information for visitor stitching simply attempt to match IP-addresses across user logs. Thus, the geolocation information is only useful in this limited context.

SUMMARY

This summary is provided to introduce a selection of concepts in a simplified form that are further described below in the Detailed Description.

The present application provides for leveraging geolocation information of user logs for visitor stitching using core geo-points from each user log. A core geo-point is a geo-point (e.g., a longitude and a latitude) that is representative of the geolocation information in the log. Core geo-points are used to identify which user logs, such as cookie logs, are associated with each other to indicate that they belong to the same user or similar users. The associated user logs are used to improve services for users by leveraging information from each associated user log.

A geolocation system determines distances between core geo-points from different user logs and uses the distances to infer associations between the user logs. Short distances indicate similar core geo-points and strong associations between user logs. When an association between user logs is sufficiently strong, the association is identified and the user logs may be assigned to a common user.

The present application further provides for reliably and accurately determining core geo-points of user logs to use for visitor stitching. Core geo-points are identified from a user log by clustering its geo-points. Cluster analysis, or clustering, groups a set of geo-points in such a way that geo-points in the same group (called a "cluster") are more similar (in some sense or another) to each other in some defined way than to those in other groups (or "clusters"). A cluster of geo-points indicates that the cluster represents an area of interest to a user, such as a home or work location. A core geo-point of a user log is selected from each cluster, which can be a center point of the cluster.

Prior to clustering, a density is determined for each geo-point in the set of geo-points. The density is based on how many geo-points are near the geo-point compared to other geo-points in the set. Less dense geo-points are filtered from the set when they are near a denser geo-point. Less frequent geo-points in the set are less likely to be significant to the user and tend to have lower density than other geo-points in the set. Thus, the merging preserves frequently occurring geo-points while reducing the impact of less frequent geo-points. Cluster analysis is applied to the filtered set of geo-points to generate a set of core geo-points. These and other concepts are contemplated as being within the scope of the present disclosure.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Moreover, although the terms "step" and/or "block" may be used herein to connote different elements of methods employed, the terms should not be interpreted as implying any particular order among or between various steps herein disclosed unless and except when the order of individual steps is explicitly described.

Visitor stitching aims to identify which user logs belong to the same user, even where the logs represent anonymous user sessions. This identification is central to a wide variety of applications on the web that aim to provide personalized services and experiences to users. Unfortunately, visitor stitching can be complicated in that user logs, such as web or cookie logs, corresponding to a single user often span many devices and applications, including a mix of logged-in and anonymous sessions.

The present application relates to a technology for improving visitor stitching of user logs by leveraging core geo-points of the user logs. A core geo-point is a geo-point (e.g., a longitude and a latitude) that is representative of the geolocation information in the log. Core geo-points are used to identify which user logs, such as cookie logs, are associated with each other to indicate that they belong to the same user or similar users. The associated user logs are used to improve services for users by leveraging information from each associated user log.

A geolocation system determines distances between core geo-points from different user logs and uses the distances to infer associations between the user logs. Short distances indicate similar core geo-points and strong associations between user logs. When an association between user logs is sufficiently strong, the association is identified and the user logs may be assigned to a common user.

In some cases, the associations are analyzed by generating one or more feature values from metrics that incorporate the distances between the core geo-points of user logs. One suitable approach uses weighted bipartite matching between user logs, where each edge represents a distance between a core geo-point of one user log and a core geo-point of another user log. At least one edge is selected and applied to a metric based on being part of the minimum weighted bipartite matching. These edges represent the distance between the closest core geo-points amongst the user logs. Feature values can be used in a probabilistic model that determines the associations between user logs. Sufficiently associated user logs (e.g., where the association is greater than a threshold value) are identified. Highly associated user logs may be assigned to a common user.

The present application further provides for reliably and accurately determining core geo-points of user logs to use in visitor stitching. Cluster analysis, or clustering, is employed, which groups a set of geo-points in such a way that geo-points in the same group (called a cluster) are more similar (in some sense or another) to each other in some defined way than to those in other groups (clusters). A cluster of geo-points can be used to infer that the cluster represents an area of interest to a user, such as a home or work location. A core geo-point of a user log is selected from each cluster, which can be a center point of the cluster.

Common approaches to clustering determine a center point for a cluster based on each geo-point's distance from the center point. As the number of geo-points decreases, individual geo-points have a greater impact on the identity of the center point. Thus, a large quantity of precise geo-points is needed so that individual geo-points do not overly influence the identity of a cluster. However, user logs from some sources, such as cookie logs, tend to not satisfy these criteria. In various implementations, clustering a set of geo-points includes filtering the set of geo-points and applying a clustering algorithm to the filtered set of geo-points. The filtering reduces the impact of less frequent geo-points on the clustering algorithm enabling the clustering algorithm to reliably identify clusters of geo-points.

In order to filter the set geo-points, a density is determined for each geo-point in the set. The density of each geo-point can be determined with respect to the overall set of geo-points. In some cases, the density of a geo-point is determined based on a number of geo-points of the set that are within a designated area surrounding the geo-point (e.g., within a one-mile radius of the geo-point). The number of geo-points within the designated area is compared to the number of geo-points in the overall set to determine the density of the geo-point. This can include forming a ratio between (e.g., dividing) the number of geo-points within the designated area and the number of geo-points in the overall set to calculate the density.

At least one of the geo-points is merged with at least one other geo-point based on the densities of the geo-points. Merging a geo-point can include removing the geo-point from the set of geo-points. Less dense geo-points are merged into denser geo-points, thereby filtering the less dense geo-points from the set. In some cases, using a given geo-point, geo-points within a designated area surrounding the given geo-point are merged based on having a lower density than the given geo-point. The designated area can be the same area used to determine the density of the given geo-point. Less frequent geo-points in the set are more likely to be noise and tend to have lower density than other geo-points in the set. Thus, the merging preserves frequently occurring geo-points while reducing noise.

In some cases, the merging employs an iterative approach, where each iteration includes selecting a given geo-point, and merging any suitable geo-points (e.g., lower density) into the selected geo-point. Each geo-point may be selected as the given geo-point in an iteration unless the geo-point has been merged by a previous iteration. The order in which the geo-points are selected as given geo-points for the iterations can be determined based on the density of the geo-points. For example, the geo-points may be selected in order of their density from highest to lowest. The geo-points optionally may also be selected based on their frequency in the set of geo-points (e.g., from highest to lowest). For example, density may be used as a primary factor in selection order and frequency may be used as a secondary factor in selection order (i.e., a as tie breaker). The iterating can continue until each geo-point in the set has either been used as the given geo-point or has been merged.

A clustering algorithm is applied to the filtered set of geo-points to identify clusters of geo-points. In some cases, the clustering algorithm is configured with a designated number that caps the number of clusters the algorithm will identify from a filtered set of geo-points. An example of a suitable clustering algorithm is a k-means algorithm, where the designated number of clusters is equal to k. A geo-point (s) can be selected from each cluster identified by the clustering algorithm. For example, the geo-points may be selected based on being identified as center points of clusters. The selected geo-points can be designated as the core geo-points of the set of geo-points. As used herein, a core geo-point refers to a geo-point that selected as being representative of a cluster, such as a center point of the cluster or the most frequent geo-point in the cluster. Due to the merging of the set of geo-points, these core geo-points are less likely to be influenced by noise.

In some implementations, a divide-and-conquer approach is used to cluster geo-points. A group of geo-points is divided into buckets, or sets, of geo-points, where each bucket includes a respective set of geo-points. A set of core geo-points is identified for each set by filtering the set, and applying a clustering algorithm to the filtered set (e.g., using the same filtering described above for each set and the same clustering algorithm for each set).

The core geo-points of the overall group can then be identified by collectively analyzing the core geo-points from the sets. This can be accomplished using an iterative approach that generates new buckets from the core geo-points from each set to create new sets and identifies core geo-points of those new sets (e.g., using the same filtering described above for each new set and the same clustering algorithm for each new set). The iterations can continue in this manner until a predefined ending condition with the core geo-points from the final iteration being designated as the core geo-points of the overall group. The ending condition may be that an iteration results in k or fewer core geo-points, where k is the designated number of clusters described above that is used for the clustering algorithm of the iteration.

Figure 1:
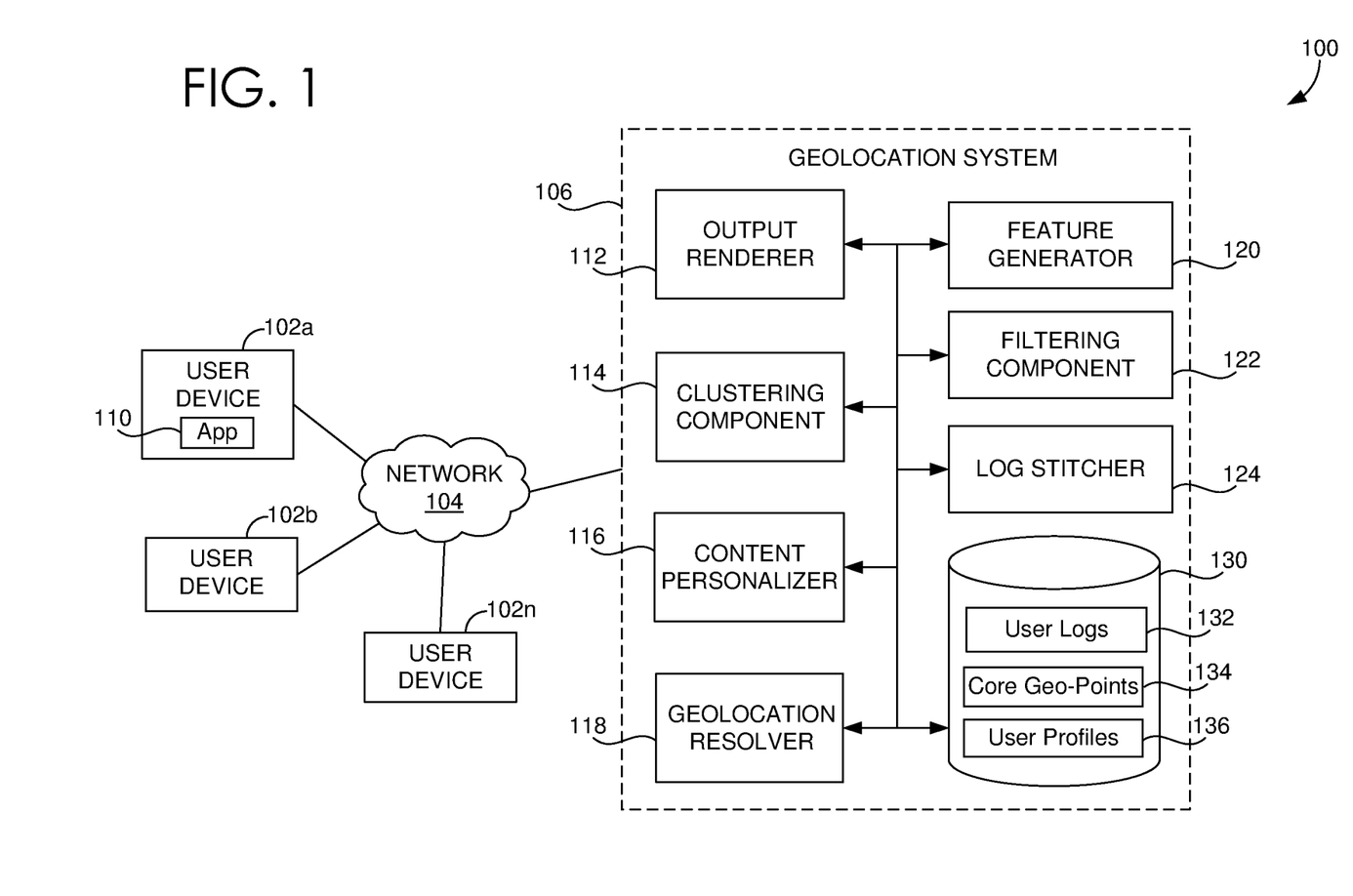
FIG. 1 shows a block diagram showing an example of an operating environment in accordance with embodiments of the present disclosure.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and geolocation system 106. Geolocation system 106 includes output renderer 112, clustering component 114, content personalizer 116, geolocation resolver 118, feature generator 120, log stitcher 124, and storage 130.

It should be understood that operating environment 100 shown in FIG. 1 is an example of one suitable operating environment. Each of the components shown in FIG. 1 may be implemented via any type of computing device, such as one or more of computing device 700, described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data sources may be employed within operating environment 100 within the scope of the present disclosure. Each may comprise a single device or multiple devices cooperating in a distributed environment. For instance, geolocation system 106 may be provided via multiple devices arranged in a distributed environment that collectively provide the functionality described herein. Additionally, other components not shown may also be included within the distributed environment. In some cases, functionality of geolocation system 106 can be integrated, at least partially, into a user device, such as user device 102a. Furthermore, geolocation system 106 may at least partially be a cloud computing service.

User devices 102a through 102n can be client devices on a client-side of operating environment 100, while geolocation system 106 can be on a server-side of operating environment 100. Geolocation system 106 can comprise server-side software designed to work in conjunction with client-side software on user devices 102a through 102n so as to implement any combination of the features and functionalities discussed in the present disclosure. An example of such client-side software is application 110 on user device 102a. Each other device shown may include a similar application, with similar functionality. This division of operating environment 100 is provided to illustrate one example of a suitable environment, and it is noted there is no requirement for each implementation that any combination of geolocation system 106 and user devices 102a through 102n to remain as separate entities.

User devices 102a through 102n comprise any type of computing device capable of being operated by a user. In some implementations, user devices 102a through 102n are the type of computing devices described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices include one or more processors, and one or more computer-readable media. The computer-readable media includes computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of providing geolocation data to geolocation system 106. It is contemplated herein that "application" be interpreted broadly. As one example, an application can be installed on an operating system of a user device. As another example, an application can be a service integrated into an operating system of a user device. In various implementations, an application can be on a user device, as shown with respect to application 110, but can at least partially be hosted server-side (e.g., on geolocation system 106).

As used herein, geolocation data comprises any information that geolocation system 106 can utilize to determine one or more geolocations of a user device (e.g., the user device that provides the geolocation data). The geolocation data can be stored by geolocation system 106 in one or more user logs 132. In some cases, the user logs are received from user devices and include the geolocation data. As another example, at least one user log may be generated by geolocation system 106 from the geolocation data.

Geolocation system 106 optionally includes geolocation resolver 118, which is configured to resolve the geolocation data to the geolocations. In some cases, geolocation resolver 118 is configured to resolve the geolocation data into a consistent format for processing by geolocation system 106, such as into geo-coordinates (e.g., a longitude and latitude and optionally elevation), or geo-points. However, in other implementations, the geolocation data includes the information in an appropriate format for processing (e.g., when geolocation system 106 receives user logs 132). Resolved geolocation data can be stored in the user logs or be generated as needed for processing.

One example of geolocation data that can be provided to geolocation system 106 by one or more applications (e.g., application 110) on a user device includes data generated at least partially using a GPS receiver on the user device. In this case, the geolocation data can comprise GPS coordinates, such as longitude, latitude, and optionally elevation. Another example of geolocation data includes data generated at least partially based on a network address of the user device, such as an Internet Protocol (IP) address. The network address can be looked up to determine a geolocation of the user device. For example, geolocation resolver 118 could look up the IP address to determine one or more geo-coordinates (e.g., using a lookup service). Other examples of geolocation data include network name information, such as one or more sensed Wi-Fi and Bluetooth networks that can be resolved to one or more geo-points. It should be appreciated that many approaches are possible for geolocation of a user device and geolocation data can take a variety of forms. Further, any combination of these approaches can be implemented in operating environment 100.

Geolocation data can be generated based on sensed user interactions with user devices. The user interactions can be any combination of passive or active interactions. An example of passive interactions includes a user carrying around a user device, which may result in a trail of GPS coordinates being provided by an application (e.g., application 110). An example of an active interaction includes where an application (e.g., application 110) comprises a web browser and a user navigates to a website using the web browser. In this case, the geolocation data may be captured as an IP address. For example, the geolocation data may be captured in a cookie, such as a tracking cookie that compiles a long-term record of the user's browsing history. The long-term record can indicate a plurality of geo-points with optionally a time-stamp for each geo-point.

Geolocation data of a user may be captured in a session where the user is a participant in the session. As used herein, a session refers to an interactive information interchange involving two or more communicating devices, or at least one computer and user. A session can have predefined start and end conditions, which may be programmed into application 110, or another application (e.g., on geolocation system 106) used to provide geolocation data to geolocation system 106, or can be identified on geolocation system 106. An established communication session may involve more than one message in each direction. A session can be stateful, meaning that at least one of the communicating participants needs to save information about the session history in order to be able to communicate, or stateless, where the communication consists of independent requests with responses.

As indicated above, applications (e.g., application 110) on user devices can be used to capture the geolocation data in association with one or more sessions of users of those devices. Each of one or more user logs in user logs 132 can correspond to the one or more sessions. For example, each session could correspond to a respective user log of user logs 132. In other cases, a user log may correspond to multiple sessions. Where the applications employ cookies for capturing the geolocation data, each of one or more user logs in user logs 132 may correspond to a respective cookie. As examples, a session may be captured by a session cookie or a tracking cookie. Cookies can include IP addresses, user-agent strings, geo-coordinates, and cookie identifiers. Sessions generated by the same cookie identifier may optionally be merged into a common cookie or user log corresponding to a user log of user logs 132.

As indicated above, each user log of user logs 132 corresponds to one or more geolocations, or geo-points. The geo-points form patterns that can be identified by analyzing the geo-points using cluster analysis. In some cases, it is desirable to identify clusters from a set of geo-points that is not guaranteed to include many geo-points or be free from noise, such as those from an individual user log, or other subset of user logs 132. One such case is where each user log corresponds to a web cookie and each cookie is analyzed individually for patterns formed by its geo-points. Web cookie logs from websites often include a few frequent core geo-points with some noise. However, as the number of geo-points provided to a clustering algorithm decreases, individual geo-points can have a greater impact on the identity of the center point. Thus, the clustering algorithm may be unable to accurately identify clusters of the geo-points.

In accordance with implementations of the present disclosure, filtering component 122 is configured to filter the geolocations (e.g., geo-points) from user logs 132 prior to applying a clustering algorithm to those geolocations. The filtering reduces the impact of noise on the clustering algorithm enabling the clustering algorithm to reliably identify clusters of geo-points.

Figure 2:
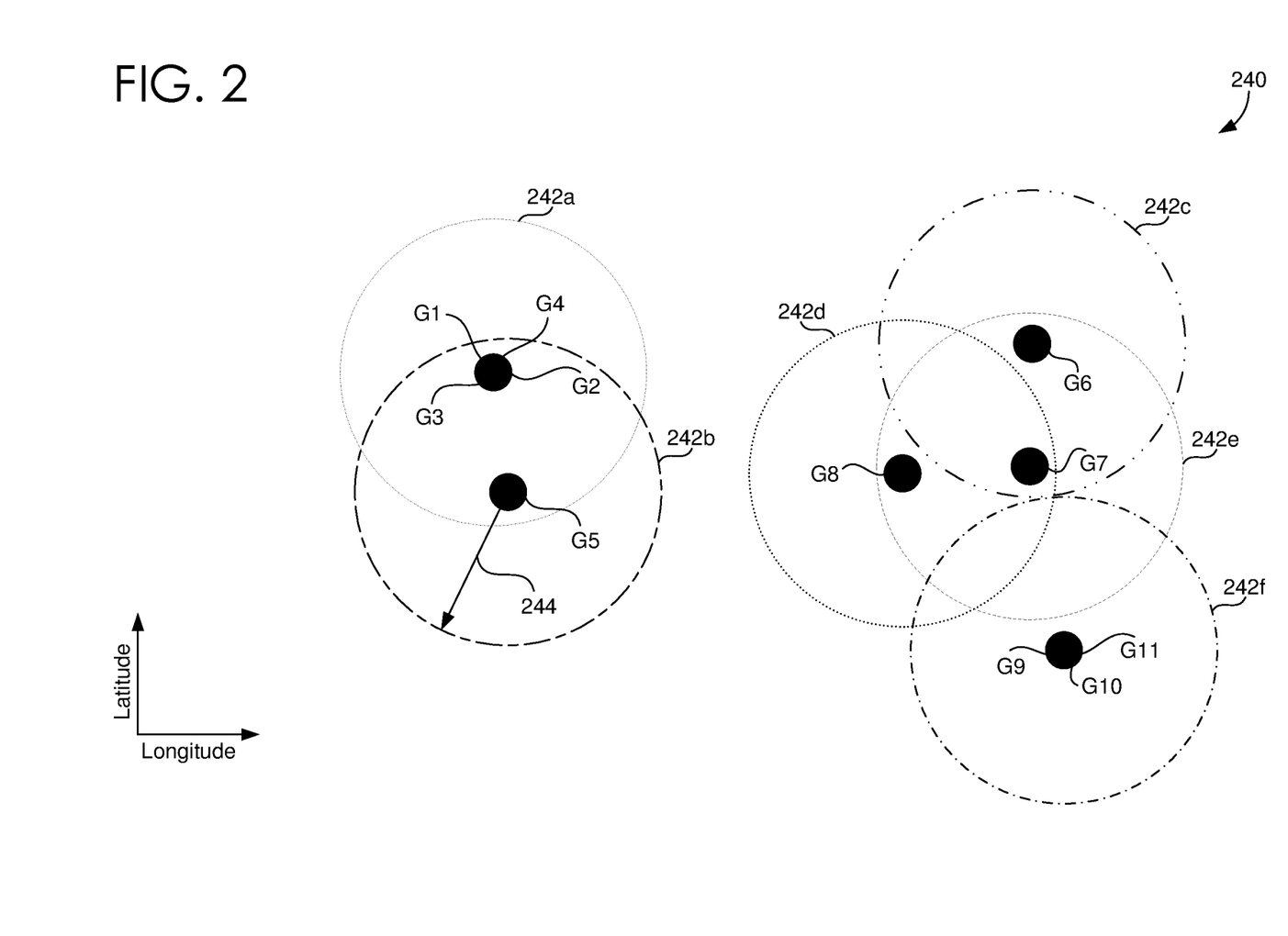
FIG. 2 shows a graph of a set of geo-points and surrounding areas in accordance with embodiments of the present disclosure.

Exemplary filtering of a set of geo-points is described with respect to FIGS. 1 and 2. FIG. 2 shows graph 240 of a set of geo-points and surrounding areas. The set of geo-points includes geo-points G1, G2, G3, G4, G5, G6, G7, G8, G9, G10, and G11. Each geo-point includes a longitude and latitude plotted on graph 240. In order to filter a set of geo-points, filtering component 122 can determine a density for each geo-point in the set. In some implementations, the density of each geo-point is determined with respect to the overall set of geo-points. For example, the density of a geo-point can be determined based on a number of geo-points of the set that are within a designated area surrounding the geo-point.

FIG. 2 shows examples of designated area surroundings for each geo-point. Surrounding area 242a corresponds to geo-points G1, G2, G3, and G4, surrounding area 242b corresponds to geo-point G5, surrounding area 242c corresponds to geo-point G6, surrounding area 242d corresponds to geo-point G7, surrounding area 242d corresponds to G8, and surrounding area G9 corresponds to geo-points G9, G10, and G11. Filtering component 122 determines each surrounding area based on the corresponding geo-point. In some implementations, filtering component 122 determines the surrounding area for a geo-point as an area within a designated radius of the geo-point, as shown. Although each surrounding area uses the same radius in FIG. 2, other the radius could vary amongst geo-points. Further, it is noted that surrounding areas can be determined in any of ways and can take any number of shapes (e.g., square areas or otherwise).

In some implementations, filtering component 122 determines a surrounding area of a geo-point based on at least one other geo-point in the set. As an example, the surrounding area could be determined based on distances between geo-points in the set. In some implementations, the distance is the average distance between each geo-point to its nearest neighbor in the set. It is noted that the calculation could additionally or instead be performed on geo-points in a group that includes the set as a subset thereof. The distance can be used to calculate the surrounding area. As an example, FIG. 2 shows radius 244, which is based on the distance (e.g., equal to the distance). Each surrounding read could be based on the same distance.

Although filtering component 122 can determine one or more variables of the surrounding areas, such as the radius described above, by analyzing at least some of the geo-points in the set, in some cases, these factors may be predefined. As one example, the radius could be approximately 1 mile. In some implementations, the radius is less than approximately 2 miles. It is further noted that the variables could be machine learned based on other sets of geo-points.

In the present example, filtering component 122 determines the density of a geo-point based on the number of geo-points within the surrounding area of the geo-point compared to the number of geo-points in the overall set. This can include dividing the number of geo-points within the surrounding area by the number of geo-points in the overall set to calculate the density In one approach, the density $f(x_i)$ of geo-point $x_i$ of set of geo-points $X_l$ can be calculated using the following equation:

$$\sum_{x \varepsilon X_l} I(dist(x, x_i) < \theta)/X_l$$

In the above equation, $\theta$ is the radius of the surrounding area. Using this approach, filtering component 122 can compute the densities as {G1, 4/11}, {G2, 4/11}, {G3, 4/11}, {G4, 4/11}, {G5, 4/11}, {G6, 1/11}, {G7, 2/11}, {G8, 1/11}, {G9, 2/11}, {G10, 2/11}, and {G11, 2/11}.

Filtering component 122 can filter the set of geo-points by merging at least one of the geo-points with at least one other geo-point based on the densities of the geo-points. Merging a geo-point can include removing the geo-point from the set of geo-points. A geo-point may be merged with another geo-point based on being less dense than the other geo-point.

In some cases, using a given geo-point, geo-points within a designated area surrounding the given geo-point are merged based on having a lower density than the given geo-point. The designated area can be the same area used to determine the density of the given geo-point, or a different surrounding area can be employed.

In the example above, given geo-point G7, of density 2/11, geo-points G6 and G8 can be merged with geo-point G7 based on each having densities of 1/11, which is lower than the density of 2/11, and based on being located within surrounding area 242e.

In some cases, the merging employs an iterative approach, where each iteration includes selecting a given geo-point, and merging any suitable geo-points (e.g., lower density) into the selected geo-point. Each geo-point may be selected as the given geo-point in an iteration unless the geo-point has been merged by a previous iteration. The order in which the geo-points are selected as given geo-points for the iterations can be determined based on the density of the geo-points. For example, the geo-points may be selected in order of their density from highest to lowest. The geo-points optionally may also be selected based on their frequency in the set of geo-points (e.g., from highest to lowest). For example, density may be used as a primary factor in selection order and frequency may be used as a secondary factor in selection order (i.e., a as tie breaker). The iterating can continue until each geo-point in the set has either been used as the given geo-point or has been merged.

Using the example of FIG. 2, filtering component 122 can sort the geo-points from highest density to lowest density, using frequency of the geo-point in the set as a secondary sorting factor. The sorted list can be: {G1, 4/11}, {G2, 4/11}, {G3, 4/11}, {G4, 4/11}, {G5, 4/11}, {G9, 2/11}, {G10, 2/11}, and {G11, 2/11}, {G7, 2/11}, {G6, 1/11}, {G8, 1/11}.

In a first iteration, geo-point G1 is the given geo-point and filtering component 122 merges geo-points within surrounding area 242a that are less dense, or equally dense as geo-point G1. Geo-point G1 is added to an output set of the filtering and the resultant list reads: {G9, 2/11}, {G10, 2/11}, {G11, 2/11}, {G7, 2/11}, {G6, 1/11}, and {G8, 1/11}.

In a second iteration, geo-point G9 is the given geo-point and filtering component 122 merges geo-points within surrounding area 242f that are less dense, or equally dense as geo-point G9. Geo-point G9 is added to the output set and the resultant list reads: {G7, 2/11}, {G6, 1/11}, {G8, 1/11}.

In a third iteration, geo-point G7 is the given geo-point and filtering component 122 merges geo-points within surrounding area 242e that are less dense, or equally dense as geo-point G7. Geo-point G7 is added to the output set and having traversed the list, filtering component 122 completes filtering. The filtered output set reads: G1, G9, and G7.

The filtering by filtering component 122 favors including geo-points in the filtered set that are denser and higher frequency than other geo-points in the set. Thus, the merging tends to preserve frequently occurring geo-points while filtering out geo-points that correspond to noise. Filtering component 122 provides the filtered geolocations to clustering component 114, which applies a clustering algorithm to the filtered set (e.g., G1, G9, and G7 in the above example).

Clustering component 114 can employ any suitable clustering algorithm to identify clusters of geo-points. In some cases, the clustering algorithm is configured with a designated number that caps the number of clusters the algorithm will identify from a filtered set of geo-points. Typically, the designated number is greater than or equal to two meaning the algorithm will identify one or two clusters depending on the contents of the set. Where the set geo-points being clustered corresponds to a single user, two clusters could correspond respectively to a home location and a work location of the user. It may be desirable that the designated number be greater than or equal to three to account for at least one additional primary region.

An example of a suitable clustering algorithm is a k-means algorithm, where the designated number of clusters is equal to k. The K-means algorithm aims to partition the filtered set of geo-points into at most k sets, or clusters, to minimize the within-cluster sum of squares (WCSS) (sum of distance functions of each geo-point in the cluster to the K center). Variations to the k-means algorithm can be employed including spherical k-means and k-medoids, which modify the distance function. As used herein, k-means based clustering algorithm refers to the k-means algorithm or any of these various modified versions thereof.

In some implementations, clustering component 114 selects at least one geo-point from each cluster identified by the clustering algorithm. For example, the geo-points may be selected based on being identified as center points of clusters. As used herein, a center point can correspond to a centroid of a cluster, or a geo-point from the filtered set that is closest to the centroid of the cluster. The center point for a cluster may be the same point used by a clustering algorithm to identify the cluster. In some cases, one center point is selected from each cluster. The selected geo-points can be designated as the core geo-points of the set of geo-points. Due to the merging of the set of geo-points, these core geo-points are less likely to be influenced by noise.

In some implementations, geolocation system 106 uses a divide-and-conquer approach to cluster geo-points. The divide-and-conquer approach can break down the problem of identifying a designated number of clusters from a group of geo-points into sub-problems, and determine the clusters from the outputs of those sub-problems. Geolocation system 106 divides a group of geo-points into buckets of geo-points, where each bucket includes a respective set of geo-points. The geo-points in each set can be unique to that set. Further, geolocation system 106 can be configured to form the buckets so they are of substantially equal size (e.g., a plus or minus one member difference amongst buckets).

A set of core geo-points is identified for each set by filtering the set (e.g., using filtering component 122), and applying a clustering algorithm to the filtered set (e.g., clustering component 114). The same filtering described above can be applied to each set and the same clustering algorithm described above can be applied to each filtered set. As an example, the set of geo-points described above with respect to FIG. 2 could correspond to one of the buckets. Similar processing can occur for each other bucket using the geo-points those buckets, resulting in one or more core geo-points being determined for each set (e.g., one to k core geo-points per bucket).

The core geo-points of the overall group can then be identified by collectively analyzing the core geo-points from the sets, or buckets. One approach is to cluster those core-geo points, such as by providing them to clustering component 114. In other cases, an iterative approach is employed that generates new buckets from at least the core geo-points from each set to create new sets and identifies core geo-points of those new sets (e.g., using the same filtering described above for each new set and the same clustering algorithm for each new set). As one example, geolocation system 106 may be configured to create the same or at most the same number of buckets each iteration (e.g., fewer buckets when there are not enough geo-points for each bucket).

Geolocation system 106 can continue iterating in this manner until a predefined ending condition occurs. The core geo-points from the final iteration can be designated as the core geo-points of the overall group. An ending condition can comprise geolocation system 106 identifying convergence in the output of the iterations. In some implementations, an ending condition is that an iteration outputs k or fewer core geo-points, where k is the designated number of clusters described above that is used for the clustering algorithm.

Core geo-points or core clusters identified from geo-points can be used in a variety of ways. In some implementations, content personalizer 116 utilizes the core geo-points, or clusters to personalize content to users. In particular, because this information indicates significant locations of users, content personalizer 116 can leveraged this information to assist users by generating or selecting content based on this information. As one example, content may be generated, selected, and presented based on detecting that a user is located near or at one of the core geo-points or core clusters. There are many suitable approaches to and examples of personalizing content based on user geolocations that can be embodied by content personalizer 116. The content from content personalizer 116 can be provided to a user device associated with the user using output renderer 112.

Core geo-points can be utilized in a variety of ways, which may leverage the accuracy and reliability provided to clustering by the filtering of the geo-points. In some respects, the present disclosure provides for identifying associations between user logs of geo-points using core geo-points. Although the core geo-points used for identifying these associations can be determined utilizing any suitable means, implementations that use the filtering and clustering described above are especially effective.

In some implementations, the associations are used to stitch user logs together, such as by inferring they belong to a common user using the core geo-points. In the example of identifying user logs of a common user, at least some of user logs 132 may correspond to the same user. In some cases, each user log corresponds to a single user. Although multiple ones of user logs 132 may belong to the same user, it can be difficult to form this association between the user logs. For example, the same user may interact with the same service or services across multiple devices and through multiple applications. If the user is logged into a user account throughout these interactions, user logs generated from these interactions can readily be associated with one another based on the user account. However, in practice, a user may not be logged into a user account during at least some sessions. In these and other cases, log stitcher 124 can be employed to infer associations between the user logs using the core geo-point and/or core cluster information of user logs 132.

In some implementations, geolocation system 106 determines a set of one or more core geo-points for each user log of user logs 132. Optionally one or more user logs could be combined for these purposes. As indicated above, filtering component 122 and clustering component 114 can be utilized to identify the core geo-point, which can be stored as core geo-points 134. In particular, geo-points identified from a user log can be clustered to identify core geo-points corresponding to the user log.

Figure 3A:
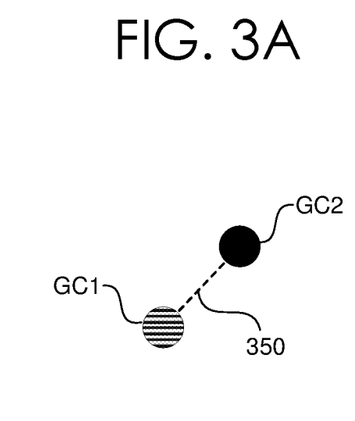
FIG. 3A shows a graph of examples of core geo-points of user logs in accordance with embodiments of the present disclosure.
Figure 3B:
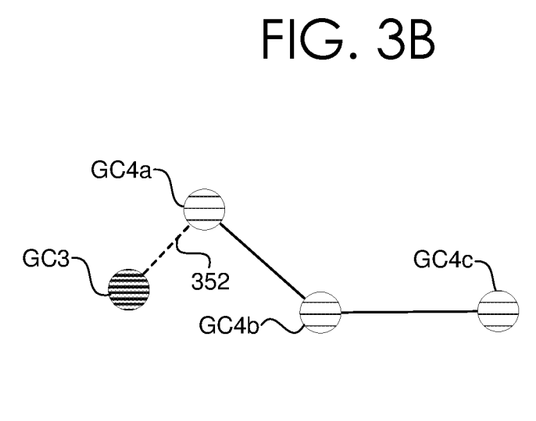
FIG. 3B shows a graph of examples of core geo-points of user logs in accordance with embodiments of the present disclosure.
Figure 3C:
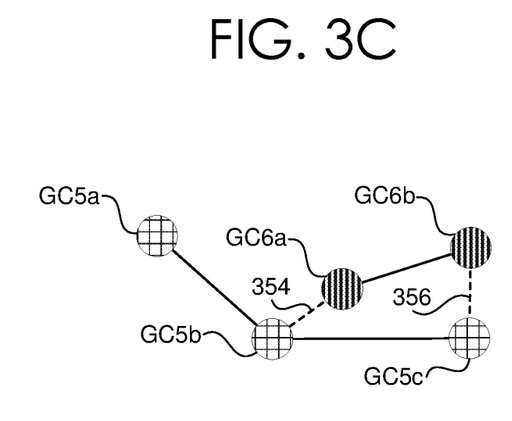
FIG. 3C shows a graph of examples of core geo-points of user logs in accordance with embodiments of the present disclosure.

Referring to FIGS. 3A, 3B, and 3C, graphs of examples of core geo-points of user logs are shown. Each user log can be one of user logs 132, by way of example. In FIG. 3A, an example is shown where each user log includes a single core geo-point. One user log has core geo-point GC1 and another has core geo-point GC2. In FIG. 3B, an example is shown where one user log includes a single core geo-point and another includes three core geo-points. One user log has core geo-point GC3 and another has core geo-points GC4a, GC4b, and GC4c. In FIG. 3C, an example is shown where one user log includes two core geo-points and another includes three core geo-points. One user log has core geo-points GC5a, GC5b, and GC5c, and another has core geo-points GC6a and GC4b. It should be appreciated that each user log could include any number of core geo-points, which may be capped at the k value of a clustering algorithm used to generate the core geo-points.

Log stitcher 124 can determine associations between user logs 132 based on distances between core geo-points amongst the user logs. In some implementations, log stitcher 124 determines the distances between core geo-points from different user logs to form the associations between the user logs. In the examples of FIGS. 3A, 3B, and 3C, log stitcher 124 is configured to calculate distance 350 between core geo-points GC1 and GC2, distance 352 between core geo-points GC3 and GC4a, distance 354 between core geo-points GC5b and GC6a, and distance 356 between core geo-points GC5c and GC6b.

Log stitcher 124 can utilize the distances computed between the core geo-points to infer associations between the user logs. In particular, shorter distances tend to indicate that the user logs have stronger associations than longer distances. The most closely associated user logs may therefore have at least one distance equal to zero, indicating that core geo-points amongst the user logs have the same value. In the context of stitching user logs to a common user, the same user is likely to have at least some of the same core geo-points or at least some proximately located core geo-points across user logs. Thus, the distances can serve as an effective factor in indicating that user logs belong to the same user.

In some implementations, log stitcher 124 analyzes associations between user logs using feature generator 120, which generates one or more feature values from metrics that incorporate the distances computed between the core geo-points of user logs. Although FIGS. 3A, 3B, and 3C show some distances that may be computed, log stitcher 124 can compute a distance between each combination of core geo-points between user logs. In FIG. 3B, examples of the other distances are a distance between core geo-points GC3 and GC4b and a distance between core geo-points GC3 and GC4c.

One example of a metric computed by feature generator 120 utilizes the average of the distances between core geo-points across user logs. Another example of a metric uses the number of distances between core geo-points across user logs that are below a threshold value. A further example of a metric uses the highest distances between core geo-points across user logs. Yet another example uses the lowest distance between core geo-points across user log.

In some implementations, feature generator 120 uses one or more metrics that are based on weighted bipartite matching between user logs. Feature generator 120 can form a bipartite graph G=(U, V, E), where its vertices (core geo-points) are divided into two disjoint sets U and V, and each ($u_i$, $v_j$) indicates a connection between them. Each edge can represents a distance between a core geo-point of one user log and a core geo-point of another user log, such as distance 350. Feature generator 120 can select at least one edge apply the edge to the metric. In some implementations, an edge is selected based on being part of the minimum weighted bipartite matching. These edges represent the distance between the closest core geo-points amongst the user logs. One such example employing minimum bipartite matching uses the equations:

$$\min E\Sigma_{(u_i, v_j) \in E} w_{ij} x_{ij},$$

$$s.t. \ \Sigma_{i=1}^{N} x_{ij} = 1, \forall_j = 1, \ldots N,$$

and $x_{ij} \varepsilon \{0,1\}$

In the foregoing, N can be the smallest cardinality between two core geo-point sets min(|U|, |V|), $w_{ij}$ can be a distance between core geo-points, and $x_{ij}$ can be 1 if ($u_i$, $v_j$) is an edge of the minimum weighted bipartite matching. In FIGS. 3A, 3B, and 3C, minimum weighted bipartite matching is indicated using dashed lines. Core geo-points belonging to the same user log are connected via a solid-line (geo-points graphed with the same shading belong to the same user log). Once feature generator 120 computes the bipartite matching, feature generator 120 can apply the average distance between matched graphs to a metric.

Log stitcher 124 utilizes the feature values from feature generator 120 to determine associations between the user logs. In some implementations, log stitcher 124 uses the feature values in a probabilistic model that determines the associations between user logs. Sufficiently associated user logs (e.g., where the association is greater than a threshold value) are identified. Highly associated user logs may be assigned to a common user.

As an example, in order to identify an association between two user logs, at least one feature value (e.g., based on the minimum weighted bipartite matching between the user logs) computed from the user logs can be applied to a probabilistic model. Other feature values can be employed that may or may not be based on metrics that incorporate distances between core geo-points. In one example, the average distance between matched graphs, described above, is used as the metric. In another example, a metric is based on comparing core geo-points between user logs and comparing user agents between logs. For example, a metric can be based on the average distance between matched graphs as a primary factor and user agent as a secondary factor to support the core geo-point based portion of the metric. In one example, the core geo-point based portion of the metric is only considered where the user agents are the same between the user logs, or in another example where they meet a threshold similarity score. A user log can indicate its user agent in a user agent strings. User agents between logs can be compared by comparing those user agent strings, such as by string-matching, or hashing the strings into respective IDs and comparing the IDs.

Having identified sufficiently associated user logs, log stitcher 124 can store these associations in user profiles 136. Each user profile may represent a common user and indicate each user log associated with the common user (log stitcher 124 can assign the user logs to the user). In some implementations, a single user log may be associated with multiple users. In others, each user log is associated with a single user.

Content personalizer 116 can personalize content to users based on the associations identified by log stitcher 124 between the user logs. For example, content can be personalized to a user based on user logs associated with the user by log stitcher 124, such as by using user profiles 136. The content from content personalizer 116 can be provided (e.g., transmitted) to a user device associated with the user using output renderer 112.

Figure 4:
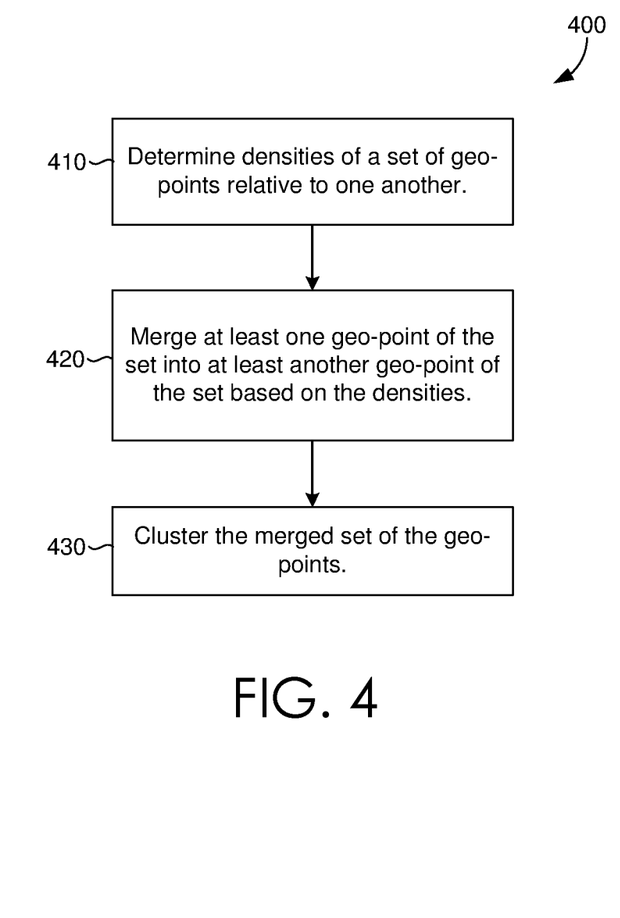
FIG. 4 is a flow diagram showing a method for clustering geolocations in accordance with embodiments of the present disclosure.

Referring now to FIG. 4, a flow diagram is provided showing one embodiment of a method 400 for clustering geolocations. At block 410, method 400 includes determining densities of a set of geo-points relative to one another. For example, one or more applications on any combination of user devices 102a through 102n can be used to provide geolocation data to geolocation system 106. Geolocation system 106 can store the geolocation data in user logs 132, optionally after processing by geolocation resolver 118. Filtering component 122 can determine for each geo-point in a set of geo-points extracted from one or more of user logs 132, a density of a geo-point relative to other geo-points of a set of geo-points extracted. For example, the density can be computed as discussed with respect to FIG. 2.

At block 420, method 400 includes merging at least one geo-point of the set with at least another geo-point of the set based on the densities. For example, filtering component 122 can merge geo-point G8 with geo-point G7 based on a comparison between the density of geo-point G8 and the density of geo-point G7. The comparison can indicate that the density of geo-point G8 is less than (or less than or equal to) the density of geo-point G7, and the merging may be performed based on the indication. Geo-point G6 can similarly be merged with geo-point G7. The merging can optionally be part of the iterative approach described above, resulting in a merged set of geo-points.

At block 430, method 400 includes clustering the merged set of geo-points. For example, filtering component 122 can provide the merged set of geo-points to clustering component 114. Clustering component 114 can compute clusters of geo-points from the merged set of geo-points using a clustering algorithm, such as a k-means based algorithm. Content personalizer 116 can optionally personalize content to one or more users based on the clusters of geo-points. As one example, one or more core geo-points can be identified from the clusters and be used to personalize the content. In some cases this can include, the one or more core geo-points being used to associate at least one of the one or more user logs with at least one other user log. The content may be personalized based on this association. It will therefore be appreciated that content personalizer 116 may personalize the content based on the clusters in a variety of potential ways.

Figure 5:
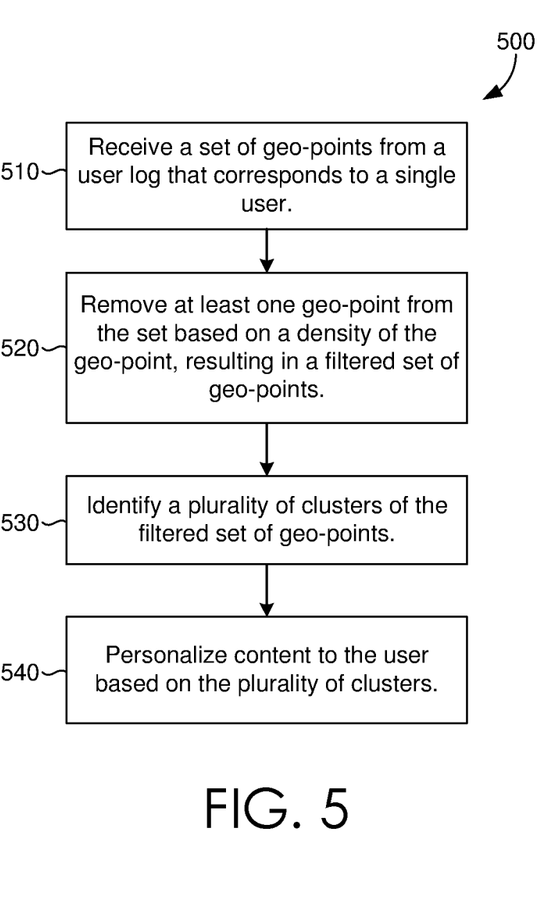
FIG. 5 is a flow diagram showing a method for clustering geolocations in accordance with embodiments of the present disclosure.

Referring now to FIG. 5, a flow diagram is provided showing one embodiment of a method 400 for clustering geolocations. At block 510, method 500 includes receiving a set of geo-points from a user log that corresponds to a single user. For example, filtering component 122 can receive geo-points extracted from one of user logs 132. The user log can correspond, for example, to a cookie log (or session log) of a user of user device 102a. The geo-points may be from geolocation data provided in the cookie log through user interactions with application 110. Although the user log corresponds to a single user (e.g., a user account having one of user profiles 136), the identity of the user may be unknown to geolocation system 106. For example, the user interactions may have occurred while the user was not signed into a user account associated with the user.

At block 520, method 500 includes filtering a geo-point from the set based on a density of the geo-point. For example, filtering component 122 may merge the geo-point with another geo-point based on the density. As another example, filtering component 122 may remove the geo-point from the set based on detecting that the density is below a threshold value. Multiple geo-points can be filtered from the set based on density, resulting in a filtered set of geo-points.

At block 530, method 500 includes identifying a plurality of clusters of the filtered set of geo-points. For example, filtering component 122 can provide the filtered set to clustering component 114. Clustering component 114 can apply a clustering algorithm to the filtered set of geo-points to identify the plurality of clusters.

At block 540, method 500 includes personalizing content to the user based on the plurality of clusters. For example, content personalizer 116 can personalize the content to the user based on the plurality of clusters. In some cases, output renderer 112 provides the content to a user device associated with the user. In some cases, the user device may not have been used to generate the geolocation data. For example, log stitcher 124 could stitch the user log to another user log based on the clusters of geo-points. If a user account is known to be associated with the other user log, the user account can be assigned to the user log as well by the stitching (based on a sufficient association between core geo-points or clusters, as described above). Thus, geolocation system 106 can leverage its knowledge about the user account in personalizing content and providing content to a user device based on the user log.

Figure 6:
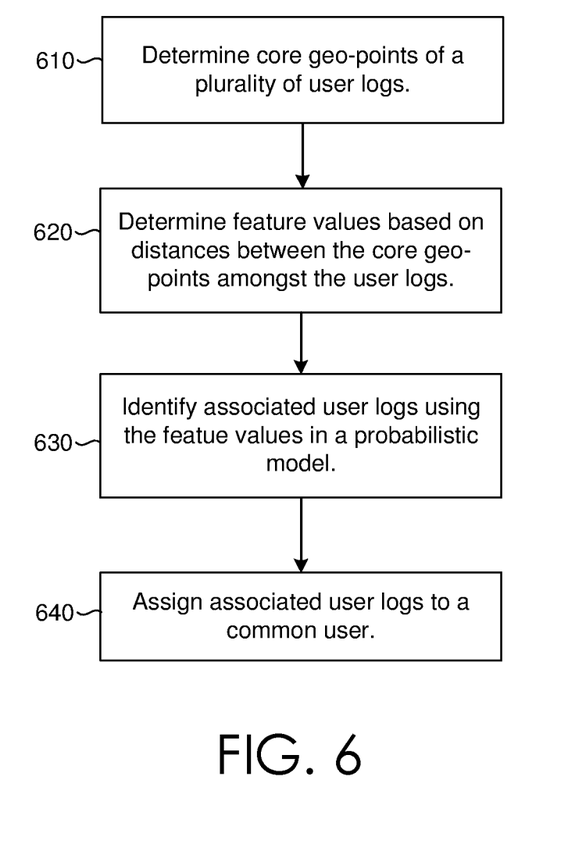
FIG. 6 is a flow diagram showing a method for associating user logs based on core geo-points in accordance with embodiments of the present disclosure.

Referring now to FIG. 6, a flow diagram is provided showing one embodiment of a method 600 for associating user logs based on core geo-points. At block 610, method 600 includes determining core geo-points of a plurality of user logs. For example, clustering component 114 can determine core geo-points for each user log of user logs 132 or any combinations thereof. As one example, clustering component 114 can utilize method 400 or 500 described above. However, any suitable approach could be employed.

At block 620, method 600 includes determining feature values based on distances between the core geo-points amongst the user logs. For example, feature generator 120 can generate the feature values from the core geo-points. Suitable examples have been described above with respect to FIGS. 3A, 3B, and 3C, such as by using bipartite matching.

At block 630, method 600 includes identifying associated user logs using the feature values in a probabilistic model. For example, feature generator 120 can provide the feature values to log stitcher 124. Log stitcher 124 can apply the feature values to a probabilistic model that predicts sufficiently associated user logs.

At block 640, method 600 includes assigning associated user logs to a common user. For example, log stitcher 124 assign the sufficiently associated user logs to a common user. The association can be stored, for example, in one of user profiles 136. Content personalizer 116 may personalize content to the common user based on the association.

Figure 7:
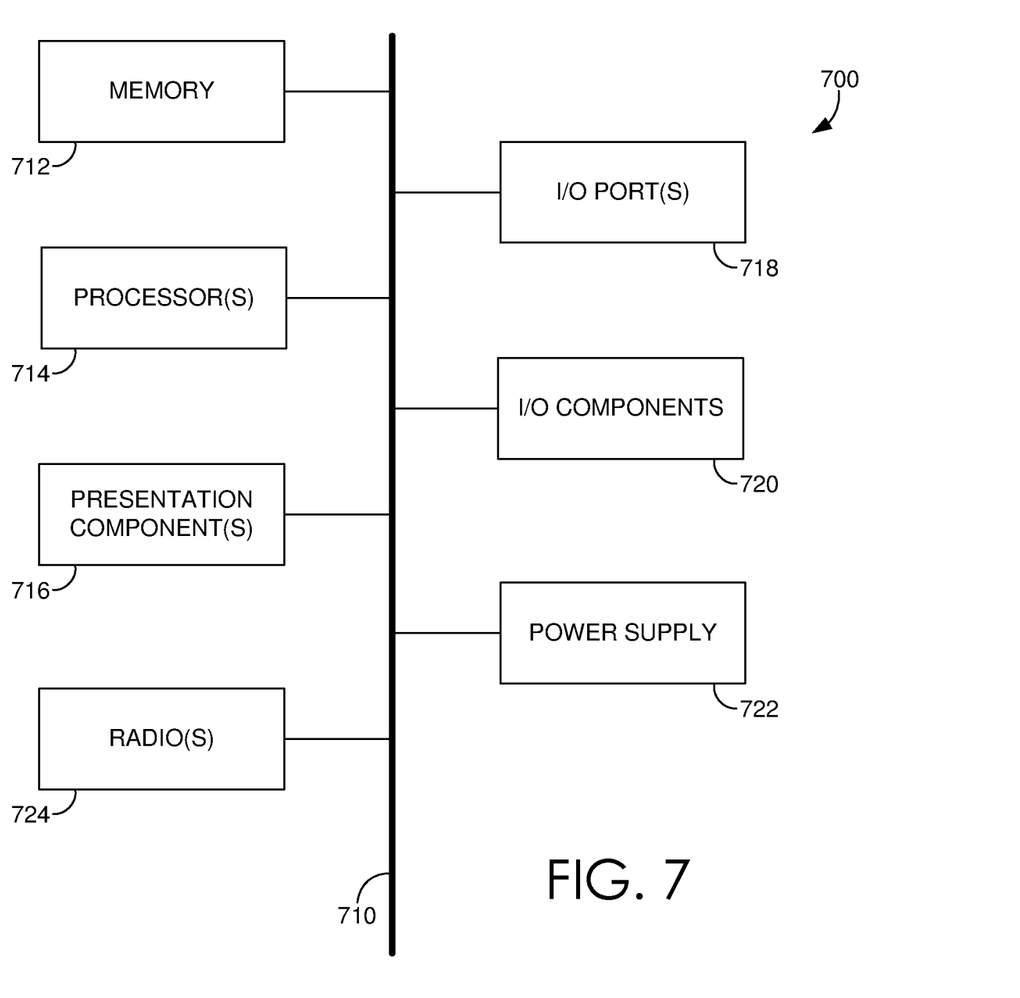
FIG. 7 is a block diagram of an exemplary computing environment suitable for use in implementations of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for recommending service content items using virtual tiles. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method, comprising:
   extracting, via a processor, a plurality of geo-points from geolocation information in a plurality of logs;
   determining, via the processor, two core geo-points from the plurality of geo-points, each core geo-point of the two core geo-points being representative of geolocation information in a corresponding log of the plurality of logs;
   associating, via the processor, two logs corresponding to the two core geo-points to a common user based on respective features of the two core geo-points; and
   selecting, via the processor, a personalized content for the common user based on the two core geo-points.

2. The computer-implemented method of claim 1, further comprising:
   determining respective densities of the plurality of geo-points; and
   determining the two core geo-points based on the respective densities of the plurality of geo-points.

3. The computer-implemented method of claim 1, further comprising:
   determining a first number of geo-points of the plurality of geo-points;
   determining a second number of geo-points that are within a designated area surrounding a geo-point of the plurality of geo-points; and
   determining a density of the geo-point based on the first number of geo-points and the second number of geo-points.

4. The computer-implemented method of claim 3, wherein the designated area surrounding the geo-point is determined based on an average distance between each geo-point to its nearest neighbor in the plurality of geo-points.

5. The computer-implemented method of claim 1, further comprising:
   determining respective densities of a first geo-point and a second geo-point of the plurality of geo-points; and
   filtering out the first geo-point from the plurality of geo-points based on a density of the first geo-point being less than a density of the second geo-point.

6. The computer-implemented method of claim 1, further comprising:
   determining respective densities of the plurality of geo-points; and
   iteratively merging, based on an order of respective densities of the plurality of geo-points, the plurality of geo-points until each geo-point in the plurality of geo-points has either been used as a given geo-point to merge another geo-point or has been merged.

7. The computer-implemented method of claim 1, further comprising:
   computing a cluster of geo-points from the plurality of geo-points using a k-means based clustering method; and
   designating a center of the cluster of geo-points as a core geo-point of the two core geo-points.

8. The computer-implemented method of claim 1, wherein the respective features of the two core geo-points comprise respective geolocation data; and the method further comprising:
   computing a distance between the two core geo-points based on the respective geolocation data; and
   associating the two logs based on the distance being below a threshold value.

9. The computer-implemented method of claim 1, wherein the selecting comprises detecting the common user being located at a location corresponding to one of the two core geo-points.

10. A non-transitory computer-readable media having a plurality of executable instructions embodied thereon, which, when executed by one or more processors, cause the one or more processors to perform operations, comprising:
  obtaining a plurality of geo-points from a plurality of logs;
  determining a plurality of clusters of geo-points based on respective densities of the plurality of geo-points;
  designating a plurality of core geo-points to represent respective clusters of the plurality of clusters of geo-points;
  identifying associations among the plurality of logs based on the plurality of core geo-points; and
  personalizing a content for a user based on the associations among the plurality of logs.

11. The computer-readable media of claim 10, the operations further comprising:
  determining a density of a geo-point of the plurality of geo-points based on a ratio between a first number of geo-points that are within a designated area surrounding the geo-point and a second number of geo-points of the plurality of geo-points.

12. The computer-readable media of claim 10, the operations further comprising:
  merging a first geo-point into a second geo-point based on a density of the first geo-point being less than a density of the second geo-point, and a distance between the first geo-point and the second geo-point being less than a threshold value.

13. The computer-readable media of claim 10, wherein designating the plurality of core geo-points comprises:
  computing a cluster of geo-points from the plurality of geo-points using a k-means based clustering method; and
  designating a core geo-point for the cluster of geo-points based on a center point of the cluster of geo-points.

14. The computer-readable media of claim 10, wherein identifying the associations comprises:
  calculating distances among the plurality of core geo-points; and
  applying the distances to a probabilistic model to determine the associations among the plurality of logs.

15. The computer-readable media of claim 10, the operations further comprising:
  assigning two logs to the user based on an association between the two logs; and
  selecting the content for the user based on respective core geo-points of the two logs.

16. A computer-implemented system, comprising:
  means for receiving a plurality of geo-points associated with a plurality of logs;
  means for determining a plurality of core geo-points based on respective densities of the plurality of geo-points;
  means for identifying associations among the plurality of logs based on the plurality of core geo-points; and
  means for selecting a content for a user based on the associations among the plurality of logs.

17. The system of claim 16, further comprising:
  means for determining respective densities of the plurality of geo-points; and
  means for iteratively merging, based on an order of respective densities of the plurality of geo-points, the plurality of geo-points.

18. The system of claim 16, wherein the means for determining the plurality of core geo-points comprises:
  means for computing a cluster of geo-points from the plurality of geo-points using a clustering process; and
  means for designating a core geo-point for the plurality of geo-points based on the cluster of geo-points.

19. The system of claim 16, wherein the means for identifying associations comprises:
  means for calculating distances among the plurality of core geo-points; and
  means for identifying the associations among the plurality of logs based on the distances.

20. The system of claim 16, further comprising:
  means for assigning two logs to the user based on an association between the two logs; and
  means for personalizing a content for the user based on respective core geo-points of the two logs.

* * * * *